United States Patent
Baker et al.

(10) Patent No.: US 7,392,014 B2
(45) Date of Patent: Jun. 24, 2008

(54) MEASUREMENT OF CHANNEL CHARACTERISTICS IN A COMMUNICATION SYSTEM

(75) Inventors: Matthew P. J. Baker, Canterbury (GB); Timothy J. Moulsley, Caterham (GB)

(73) Assignee: Koninklijke Philips Electronics N.V., Eidnhoven (NL)

(*) Notice: Subject to any disclaimer, the term of this patent is extended or adjusted under 35 U.S.C. 154(b) by 328 days.

(21) Appl. No.: 10/518,841

(22) PCT Filed: Jun. 12, 2003

(86) PCT No.: PCT/IB03/02673

§ 371 (c)(1),
(2), (4) Date: Dec. 21, 2004

(87) PCT Pub. No.: WO2004/004173

PCT Pub. Date: Jan. 8, 2004

(65) Prior Publication Data

US 2005/0277422 A1 Dec. 15, 2005

(30) Foreign Application Priority Data

Jun. 27, 2002 (GB) ................. 0214879.9
Aug. 16, 2002 (GB) ................. 0219137.7

(51) Int. Cl.
H04B 17/00 (2006.01)
H04M 11/00 (2006.01)
H04Q 7/20 (2006.01)

(52) U.S. Cl. .................. 455/67.11; 455/441; 455/450; 455/515; 370/329; 709/232

(58) Field of Classification Search ................. 455/434, 455/436–444, 450–452.1, 515, 67.11, 441; 370/328–337, 329; 709/232
See application file for complete search history.

(56) References Cited

U.S. PATENT DOCUMENTS 6,208,861 B1 * 3/2001 Suzuki ....................... 455/441

(Continued)

FOREIGN PATENT DOCUMENTS

EP 1081875 A2 3/2001

(Continued)

OTHER PUBLICATIONS

Brecht et al., "Changes in Peptidyl-Proyl CIS/TRANS Isomerase Activity and FK506 Binding Protein Expression Following Neuroprotection by FK506 in the Ischemic Rat Brain", Neuroscience, vol. 120, pp. 1037-1048, (2003).

(Continued)

Primary Examiner—William D. Cumming
(74) Attorney, Agent, or Firm—Paul Im

(57) ABSTRACT

A communication system comprises a downlink data channel for the transmission of data packets from a primary station to a secondary station and uplink and downlink control channels. The secondary station measures one or more characteristics of the data channel and issues a report to the primary station, which determines an operational parameter of the data channel in response to the report. The secondary station determines average channel characteristics over a measurement period. The length of the measurement period may be signalled by the primary station or determined directly by the secondary station. In one embodiment the selected period depends on the speed (V) of the secondary station. This is determined (604) by either station and tested to determine (606) whether it is outside the range for the current measurement period: if it is the period is reset (608).

18 Claims, 3 Drawing Sheets

U.S. PATENT DOCUMENTS

| | | | |
|---|---|---|---|
| 6,526,286 B2 * | 2/2003 | Wan | 455/515 |
| 6,720,175 B1 | 4/2004 | Worley et al. | |
| 6,775,547 B2 * | 8/2004 | Zimmerman et al. | 455/450 |
| 6,862,271 B2 * | 3/2005 | Medvedev et al. | 370/329 |
| 6,961,542 B2 * | 11/2005 | Voyer | 455/67.11 |
| 2003/0204615 A1 * | 10/2003 | Wei et al. | 709/232 |

FOREIGN PATENT DOCUMENTS

| | | |
|---|---|---|
| EP | 1081875 | 7/2003 |
| GB | 2305825 A * | 4/1997 |
| WO | WO0052846 A2 | 9/2000 |
| WO | WO0052846 A3 | 9/2000 |
| WO | WO 00/76233 A1 * | 12/2000 |

OTHER PUBLICATIONS

Barolomeis et al., "Acute Administration of Antipsychotic Modulates Homer Striatal Gene Expression Differentially", Molecular Brain Research, vol. 98, pp. 124-129 (2003).

* cited by examiner

MEASUREMENT OF CHANNEL CHARACTERISTICS IN A COMMUNICATION SYSTEM

The present invention relates to a communication system and further relates to primary and secondary stations for use in such a system and to a method of operating such a system. While the present specification describes a system with particular reference to the Universal Mobile Telecommunication-System (UMTS), it is to be understood that such techniques are equally applicable to use in other communication systems.

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to at least 4 Mbps.

In currently proposed embodiments of HSDPA, the MS signals regular measurements of the downlink channel quality (known as Channel Quality Information, CQI) to the serving Base Station (BS). The reported CQI measurements take the form of a recommended transmission format which the MS believes would result in successful transmission of a downlink packet in the prevailing channel characteristics. A change of 1 dB in measured channel quality will typically result in a change in the recommended transmission format.

The BS signals the frequency of CQI reporting to the MS as a parameter, with the maximum frequency being once per Transmission Time Interval (TTI), which in the case of HSDPA is 3 slots. In some currently proposed HSDPA embodiments, the frequency of CQI reporting may be varied on a semi-static basis depending on the level of downlink packet activity.

On receiving CQI reports from the mobile stations actively using HSDPA in its cell, the BS scheduler must decide which mobiles will be scheduled for transmission of a packet and with what MCS (Modulation and Coding Scheme). There will be a minimum delay of around 6 slots between the end of the mobile's measurement and the downlink packet transmission using the corresponding MCS. If the CQI reporting frequency is lower than once per TTI, the mean delay between the mobile's measurement and downlink packet transmission will be greater.

During this delay the channel conditions may change, resulting in an increased probability that transmission of the packet will fail and hence that the packet will need to be retransmitted. This therefore reduces the total downlink throughput and increases the delay between data arriving at the BS and being successfully received by the MS. The magnitude of the error between the actual channel conditions at the time of packet transmission and the reported CQI increases as the MS speed increases.

One known way in which the BS can attempt to compensate for the change in channel conditions after the mobile's measurement is to adjust the (implicit) data in the CQI report by the sum of downlink transmission power changes made under the closed-loop power control mechanism (of a parallel downlink control channel), which operates at an update rate of 1500 Hz.

Thus, if the net change in transmit power on the other downlink channels to a MS was +3 dB, for example, since the mobile's measurement report, the BS would schedule the packet transmission to that MS using an MCS corresponding to channel conditions 3 dB worse than those reported by the MS. However, when the MS is moving at high speed the closed-loop power control does not operate fast enough to track the fades in the channel, as the channel becomes decorrelated from one slot to the next. In such circumstances, the BS cannot use the power control commands received from the MS to correct reliably the CQI reports.

An object of the present invention is to address the problem of reduced throughput in the presence of changing channel conditions.

According to a first aspect of the present invention there is provided a communication system having a downlink data channel for the transmission of data packets from a primary station to a secondary station and uplink and downlink control channels for the transmission of control information between the primary and secondary stations, wherein the secondary station has means for measuring at least one characteristic of the data channel and for transmission of reports relating to one or more of the measured channel characteristics to the primary station on the uplink control channel, wherein the primary station has time signalling means for instructing the secondary station, via the downlink control channel, of the length of time during which channel measurements used to generate each report should be made and wherein the primary station has means for determining at least one operational parameter of the data channel depending on the reports.

By enabling the measurements made by the secondary station to be averaged over different periods, total system throughput may be increased. In addition, suitable choices of averaging period enable the frequency of reports to be reduced, thereby reducing general interference levels without reducing system performance. The averaging period may be varied depending on the speed of the secondary station, for example, this variation being initiated by either the primary or the secondary station.

According to a second aspect of the present invention there is provided a primary station for use in a communication system having a downlink data channel for the transmission of data packets from the primary station to a secondary station and uplink and downlink control channels for the transmission of control information between the primary and secondary stations, wherein means are provided for receiving on the uplink control channel reports relating to one or more measured channel characteristics of the data channel from the secondary station, time signalling means are provided for instructing the secondary station, via the downlink control channel, of the length of time during which channel measurements used to generate each report should be made and means are provided for determining at least one operational parameter of the data channel depending on the reports.

According to a third aspect of the present invention there is provided a secondary station for use in a communication system having a downlink data channel for the transmission of data packets from a primary station to a secondary station and uplink and downlink control channels for the transmission of control information between the primary and secondary stations, wherein the secondary station comprises means for measuring at least one characteristic of the data channel, means for transmitting reports relating to one or more of the measured channel characteristics to the primary station on the uplink control channel, and means for varying the length of time during which channel measurements used to generate each report are made.

The length of time during which the channel measurements are made may be determined by the secondary station or may be determined by the primary station and transmitted to the secondary station via the downlink control channel.

According to a fourth aspect of the present invention there is provided a method of operating a communication system having a downlink data channel for the transmission of data packets from a primary station to a secondary station and uplink and downlink control channels for the transmission of control information between the primary and secondary stations, wherein the secondary station measures at least one characteristic of the data channel and transmits reports relating to one or more of the measured channel characteristics to the primary station on the uplink control channel, wherein the primary station instructs the secondary station, via the downlink control channel, of the length of time during which channel measurements used to generate each report should be made and wherein the primary station determines at least one operational parameter of the data channel depending on the reports.

Embodiments of the present invention will now be described, by way of example, with reference to the accompanying drawings, wherein.

Figure 1:
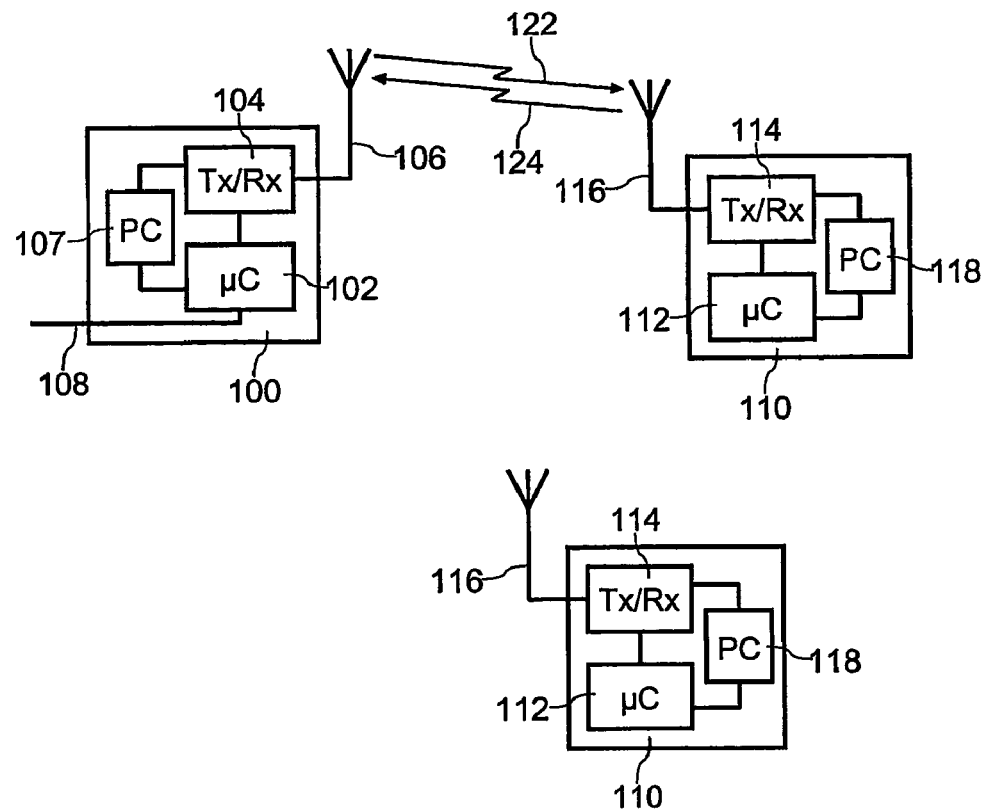
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Considering in particular a system including HSDPA functionality, the MS 110 makes regular measurements of characteristics of the downlink channel 122 which it reports to the BS 100 over the uplink channel 124, as discussed in the introductory section above. The channel characteristics would typically include one or more of bit error rate, signal to noise ratio, signal to interference level, etc. In a MIMO (Multiple Input Multiple Output) system they could also include separate characteristics for multiple antennas and multiple transmission paths.

It was indicated above that use of information from the closed-loop power control mechanism could be used by the BS 100 to compensate for changes in channel conditions after the measurement reported by the MS 110 was made. Simulations were performed to investigate this further. The following are the main assumptions made for the detailed specification of the simulated system:

Hexagonal 19-cell layout, with a representative segment of the central cell considered for the throughput estimate.

Number of stations 110 (per cell)=12

Static TTI=3 slots (2 ms)=1 sub-frame

Propagation exponent=3.76

Single path Rayleigh fast fading model (flat spectrum)

Channel conditions stationary during a sub-frame, derived from an average over the sub-frame Standard deviation of log-normal shadowing=8 dB Shadowing correlation between sites=0.5

10% of BS power allocated to common pilot channel in all cells

30% of BS power allocated to common channels (including pilot) in all cells

70% of BS power allocated to HSDPA in all interfering cells

70% of BS power available to HSDPA in wanted cell

Overheads due to dedicated channels associated with HSDPA not considered 10 spreading codes available for HSDPA MS capability: 5 spreading codes Spreading factor=16

Assumed available Modulation and Coding Schemes (MCS):

1. QPSK ¼ rate
2. QPSK ½ rate
3. QPSK ¾ rate
4. 16-QAM ½ rate
5. 16-QAM ¾ rate

Equal transmission power per code

Frame error rate computed from Signal to Interference Ratio (SIR) and block code performance bounds Scheduling delay=2 slots (delay between BS decision on the schedule and start of data transmission)

Channel quality data delay=3 slots (delay between channel measurement by MS 110 and reception of report by BS 100)

To represent streaming services it is assumed that the offered load is comprised of one constant rate data stream per MS 110. For simplicity equal bit rates are also assumed for each data stream. The data for each user is assumed to arrive at a queue in the BS 100, and the queue is updated every TTI. It is assumed that one CRC (Cyclic Redundancy Check) is attached per packet.

As a default, Chase combining of retransmissions is assumed. An erroneous packet is re-transmitted with the same MCS. Perfect maximum ratio combining is assumed, and the final SIR is computed as the sum of the SIRs of the two packets to be combined. The maximum number of transmissions per packet is limited to 10.

The reported CQI measurement is assumed to be in the form of a recommended MCS, with quantisation steps of 1 dB between different recommendations. In total there are 30 quantisation levels, with the lowest corresponding to a CIR (Carrier to Interference Ratio) of −10 dB (assuming all the BS power is allocated to HSDPA). The scheduler in the simulation chooses one of the available MCS based on the CQI value. The power control step size is assumed to be 1 dB.

The simulated scheduler considers the following parameters:

The MS 110 to which the most recent transmission was scheduled

The CIR at the MS 110 (as determined by the BS 100)

The long-term average CIR at the MS 110

The amount of data in the queue at the BS 100

The MS capability (e.g. the maximum number of channelisation codes that it can receive)

By default a proportional fair scheduler is used, which preferentially sends data to users with the highest value of (queue length)×(instantaneous CIR)/(average CIR).

Other general assumptions are that:

A data packet for any user can be allocated to any channelisation code.

More than one channelisation code can be allocated to one user.

The code block size is equal to the amount of data that can be sent with one channelisation code, which means that a "packet" may comprise multiple code blocks sent in parallel within one TTI.

Re-transmissions and first transmissions to the same user are not allowed within the same TTI.

The modulation, coding scheme and power level for first transmissions are chosen to maximise throughput.

All re-transmissions are scheduled before first transmissions, thus giving them a higher priority, and no first transmissions are allowed to a MS 110 while any re-transmissions remain to be sent.

The modulation and coding scheme of a re-transmission is the same as for the first transmission.

The available channelisation codes are allocated in sequence, until the total available power is exhausted.

Figure 2:
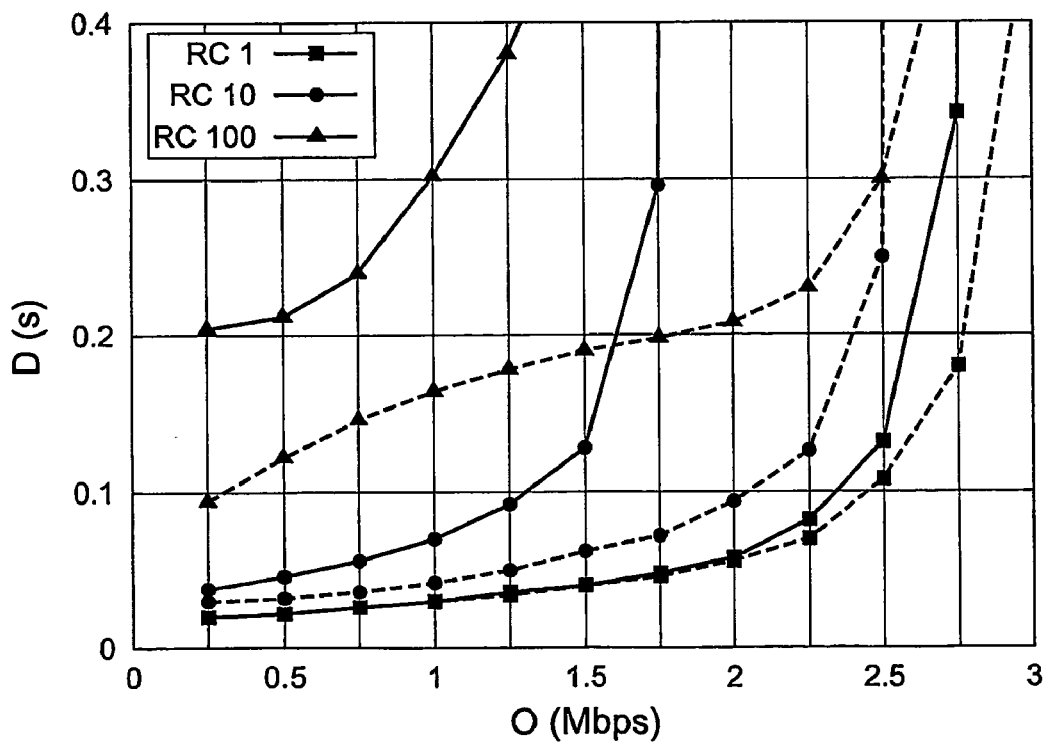
FIG. 2 is a graph showing simulated delay (D) in seconds against offered load (O) in Mbps for a mobile moving at 10 km/h, for a range of reporting rates, showing the effect of using power control information.

FIG. 2 is a graph which illustrates the potential improvements using power control information in the simulated scenario, showing how the 95 percentile delay D, in seconds, for packet delivery depends on the offered load in Mbps (millions of bits per second) for a MS 110 moving at 10 km/h. Results are shown for Reporting Cycles (RC) of once per 1, 10 and 100 TTIs, indicated respectively by square, circular and triangular markers. The solid lines relate to the BS 100 making no use of power control information, while the dashed lines relate to the BS 100 using power control information to correct the channel quality report, as discussed above. It can clearly be seen that use of power control information provides significant improvements as the rate at which the MS 110 issues reports is reduced. In particular, there is virtually no drop in system throughput at saturation when power control information is used, compared with a significant drop when it is not used.

Figure 3:
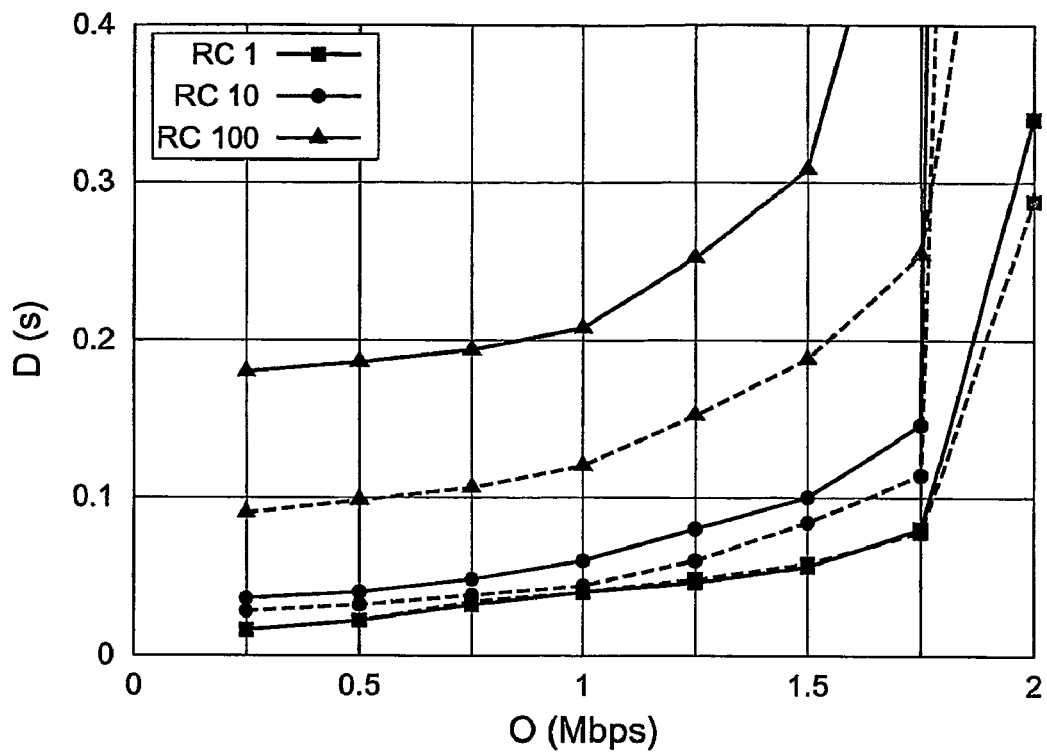
FIG. 3 is a graph showing simulated delay (D) in seconds against offered load (O) in Mbps for a mobile moving at 120 km/h, for a range of reporting rates, showing the effect of using power control information.

FIG. 3 is a similar graph to FIG. 2, but for a MS 110 moving at 120 km/h. At such speeds the channel characterisation information is out of date when the packet is transmitted, and consequently the system saturates at a significantly lower throughput than at lower speeds. The use of power control information still provides some improvement, but rather less than for a slowly moving MS, particularly for higher offered loads.

Figure 4:
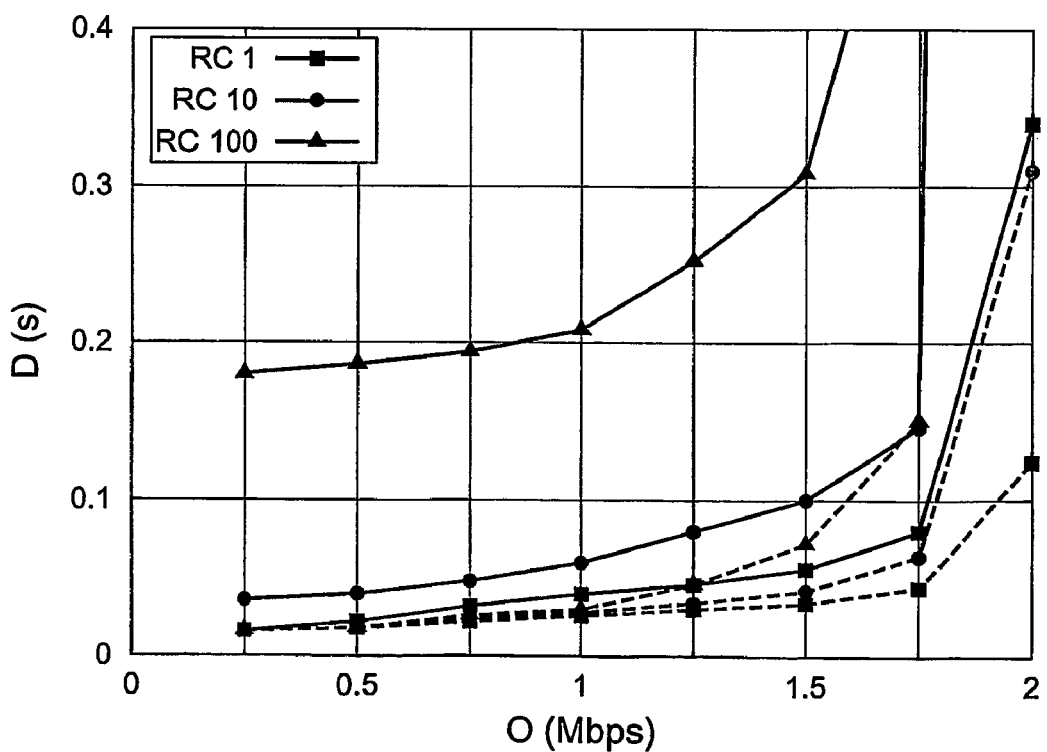
FIG. 4 is a graph showing simulated delay (D) in seconds against offered load (O) in Mbps for a mobile moving at 120 km/h, for a range of reporting rates, showing the effect of averaging channel measurements.

An improved method of addressing the effect of a moving MS 110 is provided, in a system made in accordance with the present invention, by averaging the reported channel characteristics. FIG. 4 is a graph similar to FIGS. 2 and 3, for a mobile moving at 120 km/h. However, the dashed lines now relate to the performance when the channel quality reports are averaged over 15 time slots preceding the report. It can be seen that the delays are significantly reduced compared to the use of power control information, even with very infrequent measurement reports (such as once per 100 TTIs). This could enable the frequency of measurement reports to be reduced without compromising system throughput, thereby reducing uplink interference.

Figure 5:
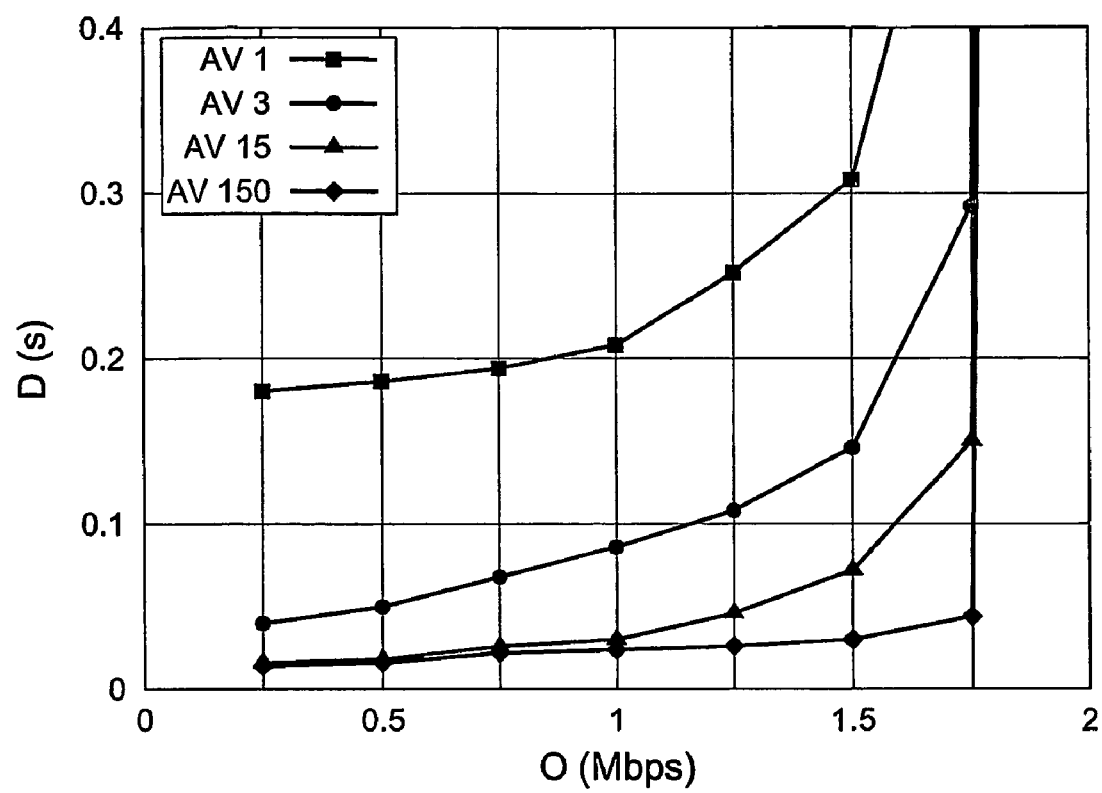
FIG. 5 is a graph showing simulated delay (D) in seconds against offered load (O) in Mbps for a mobile moving at 120 km/h, with a reporting rate of once every 100 TTIs and a range of averaging periods.

FIG. 5 is a graph showing the delay D for a range of offered loads O for a MS 110 moving at 120 km/h, a reporting cycle of once per 100 TTIs and averaging periods (AV) of 1, 3, 15 and 150 slots (indicated respectively by square, circular, triangular and diamond markers). It can be seen that each increase in the averaging period, up to 150 slots, reduces the delay. Even an average over a relatively short period, such as 3 slots, provides a significant improvement over no averaging and also over the use of power control information. The two techniques can also be used together, providing further benefits.

Even at low speeds, where the invention is unnecessary due to the effectiveness of using information from the closed-loop power control, some averaging may be used without significant effects. For example, simulations of a MS 110 moving at 3 km/h showed no significant degradation when a 3 slot averaging was used.

The averaging of channel characteristics may either be performed by the MS 110 or the BS 100. If performed by the BS 100, it could be by the averaging of individual channel reports transmitted once per TTI by the MS 110. However, it is advantageous to have the averaging performed by the MS 110 as this enables the frequency with which the reports are transmitted to be reduced, thereby reducing uplink interference. The averaging period could be fixed, but in a preferred embodiment it is signalled by the BS 100 to the MS 110. The BS 100 could either signal the times, relative to the transmission time of the channel report, at which measurements should begin and end or signal the duration of the channel measurement period. Optionally, the delay between the end of the measurement period and the transmission of the report could be signalled. The duration of the measurement period could be signalled in any convenient manner. The MS 110 could make measurements continuously during this period, or preferably take a number of sample measurements which are then averaged. These sample measurements may be discontinuous, there being one or more gaps between sample measurements within the measurement period. In the case of sample measurements the signalled duration could indicate the number of measurements to be taken, with the length of and time between the measurements being either predetermined or signalled.

The BS 100 can make use of its knowledge of the averaging period, for example to predict the reliability of the received channel reports. This could be used as an input to the scheduling algorithm, for example weighting channel reports by their determined reliability.

In a further improvement, the averaging period is made dependent on the speed with which the MS 110 is moving (which the BS 100 and/or MS 110 can determine from a range of known methods, for example Doppler fading rate, rate of change of SIR, etc). Typically the effect of this would be to increase the averaging period as the speed of the MS 110 increased. The dependency of averaging period on MS speed could be signalled by the BS 100 or could be a predetermined parameter. The MS could, if required, include an indication of its speed in a channel report.

There may be a range of other reasons for changing the averaging period. For example, it could be changed when the MS 110 begins or ends soft handover, or when signalling activity occurs on another channel, such as transmission of an acknowledgement by the MS110, or when the size of the active set is changed. In systems where the effective power control rate may be altered, then a change in averaging period may be desirable at the same time. In this case, signalling of a change of power control rate could be used to signal a change in averaging period, thereby avoiding extra signalling.

Figure 6:
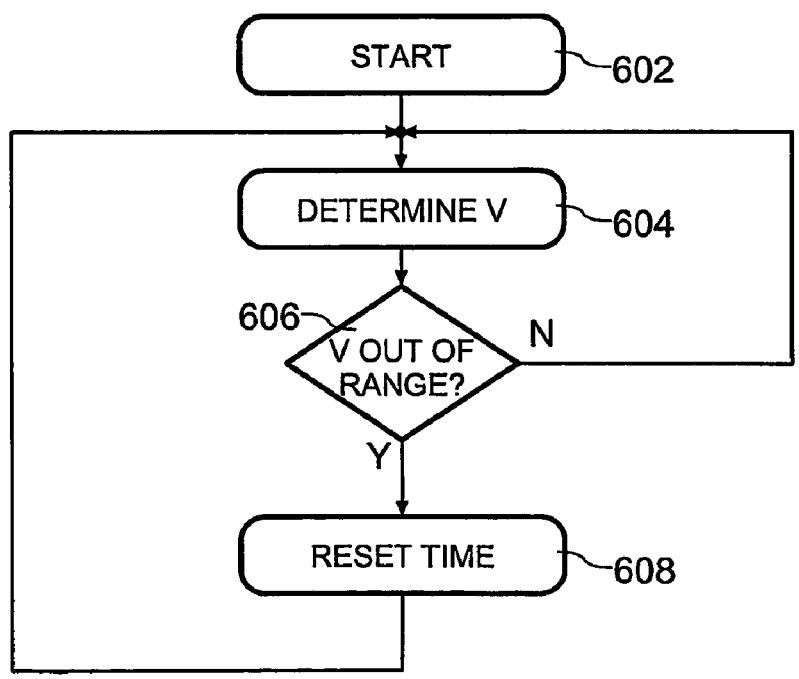
FIG. 6 is a flow chart illustrating a method of operating a communication system made in accordance with the present invention.

FIG. 6 is a flow chart illustrating one way in which a system having speed measurement capability could operate. It starts, at step 602, with a MS 110 opening a HSDPA connection with a BS 100. At step 604 the speed V of the MS 110 is determined, either by the MS or the BS. At step 606 a test is made to determine whether V is outside the range appropriate for the currently selected averaging period. If it is not (N) the system returns to step 604. If it is, the length of time over which averaging should take place is reset, either by the MS 110 or by signalling from the BS 100, after which the system returns to step 604.

In an embodiment where the frequency of CQI reporting is varied depending on downlink packet activity, a lower reporting rate when there is no downlink packet activity is beneficial. This can be achieved by use of a timer which is set when a downlink packet is received, with the reporting rate being increased while the timer is running. Alternatively, a timer could be set when no packet is detected and the reporting rate reduced while the timer is running. The action of setting the timer can be considered as changing an implicit "downlink activity" parameter, and as a special case a new CQI report can be sent on receipt of a downlink packet.

A suitable overall strategy for determining the averaging rate is as follows, assuming that the BS 100 uses the power control loop to track changes in the channel conditions between CQI reports wherever possible. If the speed of the MS 110 is known to be high then use of a long averaging period and slow reporting rate is used. Otherwise, a long averaging period and slow reporting rate is appropriate when the MS 110 is not in soft handover, while a short averaging period and fast reporting rate is appropriate when the MS 110 is in soft handover. The parameters which are needed to define the averaging process are: the CQI reporting rate; the CQI averaging period; and the timer value for determining activity-dependent reporting rates.

It is possible for the BS 100 to signal all the parameters explicitly, which maximizes flexibility but requires more downlink signalling capacity. As an alternative, parameters can be linked together in various ways. For example, the reporting rate and averaging period could be signalled as a single pair, and different pairs could be signalled for active and inactive downlink packet conditions. An extension of this would be to make the averaging period depend on the reporting rate, one convenient relationship being for the two to be set equal. Where the parameter values depend on the soft handover state, values (or pairs of values) of parameters for different active set sizes could be signalled.

Using the options described above, three alternative UMTS embodiments can be defined:
1. The averaging periods for use when the MS 110 is and is not in soft handover are defined and signalled to the MS 110 when HSDPA operation is first configured (or parameters first specified). These values can be changed by subsequent signalling.
2. The averaging period is determined by reference to the value most recently signalled for the reporting interval. In a preferred embodiment, both are equal.
3. In an embodiment where the reporting period is changed in response to varying downlink activity, the averaging period is changed as well.

The averaging period can be defined to start just before the previous CQI value is sent from the MS 110 to the BS 100, and end just before the current CQI value is sent. This allows for changes in reporting rate, whether due to activity changes or signalling, and also allows for schemes where CQI signalling occurs both regularly and also after every downlink packet.

As an alternative to the averaging period being determined by the BS 100, it could be determined by the MS 110, based on its speed and/or on other channel characteristics. The averaging period could also be varied-depending on the soft handover state (and/or active set size) and/or downlink activity level, as discussed above, and this variation could be done in a predetermined manner. The selected period could then be signalled to the BS 100 if required, to enable the BS 100 to make use of its knowledge of this period, as indicated above.

The description above related to the BS 100 performing a variety of roles relating to the present invention. In practice these tasks may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure involved in an embodiment of the present invention.

From reading the present disclosure, other modifications will be apparent to persons skilled in the art. Such modifications may involve other features which are already known in the design, manufacture and use of communication systems and component parts thereof, and which may be used instead of or in addition to features already described herein.

The invention claimed is:

1. A communication system having a downlink data channel (122) for the transmission of data packets from a primary station (100) to a secondary station (110) and uplink and downlink control channels (124,122) for the transmission of control information between the primary and secondary stations, wherein the secondary station has means (104,102) for measuring at least one characteristic of the data channel and for transmission of reports relating to one or more of the measured channel characteristics to the primary station on the uplink control channel, wherein the primary station has time signaling means (102) for instructing the secondary station, via the downlink control channel, of the length of time during which channel measurements used to generate each report are made and wherein the primary station has means (102) for determining at least one operational parameter of the data channel depending on the reports.

2. A primary station (100) for use in a communication system having a downlink data channel (122) for the transmission of data packets from the primary station to a secondary station (110) and uplink and downlink control channels (124,122) for the transmission of control information between the primary and secondary stations, wherein means (104) are provided for receiving on the uplink control channel reports relating to one or more measured channel characteristics of the data channel from the secondary station, time signaling means (102) are provided for instructing the secondary station, via the downlink control channel, of the length of time during which channel measurements used to generate each report are made and means (102) are provided for determining at least one operational parameter of the data channel depending on the reports.

3. A primary station as claimed in claim 2, characterised in that the time signaling means (102) signals the number of measurements to be made to generate each report.

4. A primary station as claimed in claim 2, characterised in that the time signaling means (102) signals the interval between each of the measurements to be made to generate each report.

5. A primary station as claimed in claim 2, characterised in that means (104,102) are provided for determining the speed of the secondary station and in that the time signaling means (102) is responsive to the determined speed to vary the signalled length of time.

6. A primary station as claimed in claim 2, characterised in that the time signaling means (102) signals a plurality of lengths of time, each corresponding to a different soft handover state.

7. A primary station as claimed in claim 2, characterised in that the time signaling means (102) signals a plurality of lengths of time, each corresponding to a different downlink activity level.

8. A primary station as claimed in claim 2, characterised in that the time signaling means (102) signals a plurality of lengths of time, each corresponding to a different downlink activity level.

9. A primary station as claimed in claim 8, characterised in that the time signaling means (102) signals the duration of a timer, activated by downlink packet activity.

10. A secondary station (110) for use in a communication system having a downlink data channel (122) for the transmission of data packets from a primary station (100) to a secondary station and uplink and downlink control channels (124,122) for the transmission of control information between the primary and secondary stations, the secondary station comprising means (114, 112) for measuring at least one characteristic of the data channel, means (114) for transmitting reports relating to one or more of the measured channel characteristics to the primary station on the uplink control channel, and means (112) for varying the length of time during which channel measurements used to generate each report are made.

11. A secondary station as claimed in claim 10, further comprising means (114,112) for receiving via the down link control channel instructions of the length of time during which the channel measurements are made.

12. A secondary station as claimed in claim 10, further comprising means (112) for determining the length of time during which the channel measurements are made.

13. A secondary station as claimed in claim 10, characterised in that the measured characteristic is one of: bit error rate; signal to noise ratio; signal to interference ratio.

14. A secondary station as claimed in claim 10, characterised in that the primary and secondary stations (100,110) each comprise a plurality of antennas and in that the reports relate to a plurality of combinations of paths between antennas.

15. A secondary station as claimed in claim 12, characterised in that means (112,114) are provided for signaling to the primary station (100) on the uplink control channel the length of time for which channel measurements are made.

16. A secondary station as claimed in claim 10, characterised in that means (112) are provided for setting a timer on receipt of a data packet and for altering the length of time during which channel measurements are made while the timer is running.

17. A secondary station as claimed in claim 12 characterised in that the length of time during which channel measurements are made is varied depending on at least one of the soft handover state, the active set size and the downlink packet activity level.

18. A method of operating a communication system having a downlink data channel for the transmission of data packets from a primary station to a secondary station and uplink and downlink control channels for the transmission of control information between the primary and secondary stations, wherein the secondary station measures at least one characteristic of the data channel and transmits reports relating to one or more of the measured channel characteristics to the primary station on the uplink control channel, wherein the primary station instructs the secondary station, via the downlink control channel, of the length of time during which channel measurements used to generate each report are made and wherein the primary station determines at least one operational parameter of the data channel depending on the reports.

* * * * *